United States Patent
Lin et al.

(10) Patent No.: US 7,688,407 B2
(45) Date of Patent: Mar. 30, 2010

(54) LIQUID CRYSTAL DISPLAY WITH TRANSMISSIVE AND REFLECTIVE REGIONS COMPRISING A FIRST ALIGNMENT FILM HAVING DIFFERENT ALIGNMENTS IN THE TRANSMISSIVE AND REFLECTIVE REGIONS AND A SECOND ALIGNMENT FILM WITH A SINGLE ALIGNMENT

(75) Inventors: Tzu-Yuan Lin, Taipei (TW);
Chun-Hung Chiang, Gubiren Township, Tainan County (TW); Fu-Cheng Hsieh, Taichung County (TW); Po-Chang Wu, Jiading Township, Kaohsiung County (TW); Ren-Hung Huang, Banciao (TW); Jin-Jei Wu, Taipei (TW); Chih-Ming Chang, Jhongli (TW); Po-Lun Chen, Chiayi (TW)

(73) Assignee: AU Optronics Corporation, Hsinchu (TW)

( * ) Notice: Subject to any disclaimer, the term of this patent is extended or adjusted under 35 U.S.C. 154(b) by 222 days.

(21) Appl. No.: 11/432,996

(22) Filed: May 12, 2006

(65) Prior Publication Data
US 2007/0046869 A1   Mar. 1, 2007

(30) Foreign Application Priority Data
Aug. 23, 2005   (TW) ............................... 94128814 A

(51) Int. Cl.
*G02F 1/1335* (2006.01)
*G02F 1/1337* (2006.01)
*G02F 1/1343* (2006.01)

(52) U.S. Cl. .................. 349/114; 349/128; 349/129; 349/141

(58) Field of Classification Search .................. 349/114
See application file for complete search history.

(56) References Cited

U.S. PATENT DOCUMENTS
5,986,735 A * 11/1999 Komatsu ..................... 349/128

(Continued)

FOREIGN PATENT DOCUMENTS
CN   1544978   11/2004

(Continued)

OTHER PUBLICATIONS
English language translation of abstract of CN 1544978.

(Continued)

*Primary Examiner*—Andrew Schechter
*Assistant Examiner*—Paisley L Arendt
(74) *Attorney, Agent, or Firm*—Thomas, Kayden, Horstemeyer & Risley

(57) ABSTRACT

A liquid crystal display with transmissive region and reflective region is provided. The display comprises an upper substrate and a lower substrate, which is settled in parallel with the upper substrate. A reflective layer is located on the reflective region of the lower substrate and an insulation layer covers the reflective layer and the lower substrate. Positive and negative driving electrodes are chiastically settled on the insulation layer. A first alignment film is positioned on the inner surface of the upper substrate, and the alignments of the first alignment film on the transmissive region and reflective region are different. A second alignment film covers the insulation layer, the positive and negative electrodes. A liquid crystal layer is located between the first alignment film and the second alignment film.

8 Claims, 1 Drawing Sheet

U.S. PATENT DOCUMENTS

| | | | |
|---|---|---|---|
| 6,583,842 B2 * | 6/2003 | Hong et al. | 349/141 |
| 6,812,978 B2 | 11/2004 | Kim et al. | |
| 6,862,058 B2 | 3/2005 | Ikeno et al. | |
| 6,862,065 B2 | 3/2005 | Liao et al. | |
| 6,914,656 B2 * | 7/2005 | Sakamoto et al. | 349/141 |
| 6,922,219 B2 * | 7/2005 | Jin et al. | 349/113 |
| 6,985,197 B2 * | 1/2006 | Chuang | 349/114 |
| 6,999,144 B2 | 2/2006 | Wu et al. | |
| 7,015,995 B2 * | 3/2006 | Ikeno et al. | 349/113 |
| 7,015,997 B2 * | 3/2006 | Choi et al. | 349/114 |
| 7,088,409 B2 * | 8/2006 | Itou et al. | 349/114 |
| 7,339,641 B2 * | 3/2008 | Zhu et al. | 349/114 |
| 7,593,078 B2 * | 9/2009 | Ochiai et al. | 349/114 |
| 2003/0038907 A1 | 2/2003 | Ikeno et al. | |
| 2004/0155999 A1 * | 8/2004 | Okumura et al. | 349/114 |
| 2005/0190324 A1 * | 9/2005 | Yang | 349/114 |
| 2006/0256268 A1 * | 11/2006 | Jeong et al. | 349/141 |

FOREIGN PATENT DOCUMENTS

| | | |
|---|---|---|
| TW | 583463 | 4/2004 |
| TW | 594287 | 6/2004 |
| TW | 1226950 | 1/2005 |

OTHER PUBLICATIONS

English language translation of pertinent parts of CN 1544978.
English language translation of abstract of 1226950.

* cited by examiner

LIQUID CRYSTAL DISPLAY WITH TRANSMISSIVE AND REFLECTIVE REGIONS COMPRISING A FIRST ALIGNMENT FILM HAVING DIFFERENT ALIGNMENTS IN THE TRANSMISSIVE AND REFLECTIVE REGIONS AND A SECOND ALIGNMENT FILM WITH A SINGLE ALIGNMENT

RELATED APPLICATIONS

The present application is based on, and claims priority from, Taiwan Application Serial Number 94128814, filed Aug. 23, 2005, the disclosure of which is hereby incorporated by reference herein in its entirety.

BACKGROUND OF THE INVENTION

1. Field of Invention

The invention relates to the production method of a liquid crystal display (LCD) and, in particular, to the manufacturing method of a transflective LCD.

2. Related Art

Opto-electronic technologies have recently made tremendous progress, pushing the rapid development in liquid crystal displays (LCD) in the digital era. The LCD has the advantages of high picture quality, small volume, light weight, low driving voltage and power consumption. Therefore, they are widely used in personal digital assistants (PDA), mobile phones, camcorders, notebook computers, desktop displays, vehicle displays, and projection televisions. They have replaced the conventional cathode ray tubes (CRT) and become the mainstream of the industry.

The LCD is the device that utilizes properties of liquid crystal for display. Since they have more flexibility in size and weight than the traditional CRT, the LCD's are commonly used in various kinds of personal systems (from the screens of mobile phones, PDA's, and digital cameras, to the display panels of televisions and advertisement boards).

In the outdoor and strong light environments, the image of the normal transmissive display has a lower contrast. The reflective display, on the other hand, provides better effect and contrast in such environments because it relies on the external sources for display. The reflective display can reduce the use of the backlit mode that consumes a lot of energy. Therefore, it is very suitable for portable electronics. However, it is more difficult for the reflective display to achieve high contrast and high color quality (particularly full colors) at high resolutions. Moreover, when the environmental light source provides insufficient light, the contrast and brightness of the reflective display are greatly reduced. Therefore, it is of great advantages to provide a transflective display using the transmissive technology that provides a backlit source. In this case, it has the advantages of both the transmissive and reflective modes. This is applicable to active driving technologies for amorphous silicon (a-Si) thin-film transistors (TFT) or low-temperature polysilicon TFT's. Consequently, most of the low-voltage information products use this kind of transflective display panels.

The transflective display panel can use the backlit system to compensate for the insufficient environmental light. When the environmental light is sufficient, the transflective display panel does not need to use the built-in light source. Instead, it makes full use of the environmental light and saves the energy by tuning off the backlit system. However, when the cell gaps of the transmissive region and the reflective region are the same, the transmittance vs. voltage curve of the transmissive region is not consistent with the reflectance vs. voltage curve of the reflective region.

If the conventional transflective display uses the single cell gap, then the transmissive region and the reflective region use different control circuits or they use different transistors for control. This may increase the complexity and difficulty in the array and the driving method.

U.S. Pat. No. 6,812,978 discloses a transflective display technology that primarily uses a dual cell gap for the liquid crystal cells or provides a transflective film. FIG. 1 is a schematic view of the conventional display unit with dual cell gaps. As shown in the drawing, a transflective display panel 1 includes an upper substrate 10 and a lower substrate disposed in parallel and a liquid crystal layer 30 inserted into the gap in between. The inner surface of the upper substrate 10, i.e., the one facing the lower substrate 20, contains a black matrix film 12 and a shared electrode 14. The black matrix film is embedded with a color filter layer (not shown). The surface of the shared electrode 14 is provided with an upper alignment film 16. The inner surface of the lower substrate 20, i.e., the one facing the upper substrate 10, has a matrix-form pixel region formed by perpendicularly intersecting electrode lines and data lines.

Each pixel region is controlled by a TFT (not shown) and divided into at least a transmissive region 40 and a reflective region 50. The pixel region includes a transparent electrode 22 on the lower substrate 20 and a passivation layer 24 on the transparent electrode 22. A reflective electrode 26 is provided on the passivation layer 24 of the reflective region 50. A lower alignment film 28 is disposed on the passivation layer 24 and the reflective electrode 26. The liquid crystal layer 30 is disposed between the upper alignment film 16 and the lower alignment film 28.

It is seen in FIG. 1 that within one pixel region, the liquid crystal layer 30 has two regions of different thickness. The cell gap $d_1$ is formed above the reflective electrode 26, i.e., in the reflective region 50. The cell gap $d_2$ is formed above the transparent electrode 22, i.e., in the transmissive region 40. Moreover, $d_2$ is about twice as much as $d_1$. Therefore, the an incident beam penetrates through the liquid crystal layer 30 and reflected by the reflective electrode 26 of the reflective region 50, the optical path is the same as that of the backlit passing through the transmissive region 40. Therefore, the transmittance vs. voltage curve of the transmissive region 40 becomes the same as the reflectance vs. voltage curve of the reflective region 50.

However, designing dual cell gaps for the liquid crystal cells will encounter the problems of a complicated manufacturing process and difficulty in controls. One cannot obtain ideal display effects by simply attaching a transflective film on the display. In view of these problems, it is thus an important subject of the field to provide an optical design needed by the transmissive and reflective regions under the premise of the liquid crystal cell with a single cell gap.

SUMMARY OF THE INVENTION

It is an aspect of the invention to provide a manufacturing method of a transflective LCD panel that uses the single cell gap design to achieve consistent transmittance vs. voltage curve and reflectance vs. voltage curve.

Another aspect of the invention is to provide a manufacturing method of a transflective LCD panel that uses the single cell gap design and the in-plan switching (IPS) technique to control the liquid crystal molecules, so that the transmittance vs. voltage curve and the reflectance vs. voltage curve become consistent.

Yet another aspect of the invention is to provide a manufacturing method of a transflective LCD panel that uses the single cell gap design and uses a photo-polymer to form an alignment film. The alignment film results in different alignment effects on the liquid crystal molecules in the transmissive and reflective regions after photo-polymerization.

A further aspect of the invention is to provide a manufacturing method of a transflective LCD panel that uses a light curable polymer to form an alignment film with single cell gaps, so that the transmittance vs. voltage curve and the reflectance vs. voltage curve become consistent.

In accordance with the above aspects, a preferred embodiment of the invention provides a transflective LCD and the method of making the same. The transflective LCD contains at least the following elements. An upper substrate and a lower substrate are disposed in parallel, with positive and negative driving electrodes chiastically settled on the lower substrate. A first alignment film and a second alignment covering the opposite surfaces of the upper and lower substrates, wherein the second alignment film covers the positive and negative driving electrode and are processed by single-axis parallel orientation. The material of the first alignment film may be a light curable polymer. Through photopolymerization, the first alignment film in the transmissive and reflective regions of the transflective LCD panel has different alignment effects on the liquid crystal molecules, thereby controlling the pretilt angles of the liquid crystal molecules in the transmissive and reflective regions and thus the transmittances thereof. A liquid crystal layer is sandwiched between the first alignment film and the second alignment film. The two substrates and the liquid crystal layer form a sandwich structure. Since the invention uses the IPS technique, the electric field formed by the positive and negative electrodes of the lower substrate is parallel to the substrate.

The second alignment film in this invention has a single alignment, whereas the first alignment film has different alignments in the transmissive and reflective regions. In this embodiment, the second alignment film and the first alignment film in the transmissive region has the same alignment, whereas they have perpendicular alignments in the reflective region. The relation between the first alignment film and the second alignment film is not only the one described in the embodiment. It does not achieve the goal of having consistent transmittance vs. voltage curve in the transmissive region and the reflectance vs. voltage curve in the reflective region. Different liquid crystal materials and cell gaps can be used along with UV irradiation or different light curable polymers to adjust the alignment angle of the first alignment film in the transmissive and reflective regions.

The material of the first alignment film can be a UV curable polymer, such as a photodimerized polymer, photodecomposed polymer, and photoisomerized polymer. The photodimerized polymer, such as the polymer derivative with cinnamate photosensitive groups or coumarin photosensitive groups, has photosensitive groups with unsaturated dual bonds in the side chain of the polymer. After being irradiated by linear polarized light for photodimerization, the surface of the polymer produces optical anisotropy, including the liquid crystal molecules to alignment in a particular direction. The photodecomposed polymer, such as polyamides, has a higher thermal stability and is not photosensitive. Under high-energy UV light, the polyamide bonds are broken anisotropically, inducing liquid crystal molecule alignment. The photoisomerized polymer, such as azobenzene, mainly has the optochemical mechanism of a photo-induced cis-trans transition. Such a transition results in anisotropy for inducing liquid crystal molecule alignment.

By controlling the UV radiation amount in the transmissive or reflective region, the liquid crystal modules in these two regions have different pretilt angles, so that the transmittance vs. voltage curve of the transmissive region and the reflectance vs. voltage curve of the reflective region roughly coincide.

Therefore, the disclosed manufacturing method of the transflective LCD has the following advantages: (1) it uses a single cell gap design to avoid the complexity in the process for the dual cell gap design; (2) it uses a single cell gap design and a single control circuit to control the transmissive and reflective regions, avoiding the complexity and difficulty in the array and driving method; (3) it can use the IPS technique and, therefore, the transflective LCD thus formed essentially has a wide solid angle without employing any additional technique; and (4) it reduces the production cost.

BRIEF DESCRIPTION OF THE DRAWINGS

These and other features, aspects and advantages of the invention will become apparent by reference to the following description and accompanying drawings which are given by way of illustration only, and thus are not limitative of the invention, and wherein.

DETAILED DESCRIPTION OF THE INVENTION

The present invention will be apparent from the following detailed description, which proceeds with reference to the accompanying drawings, wherein the same references relate to the same elements.

Figure 1:
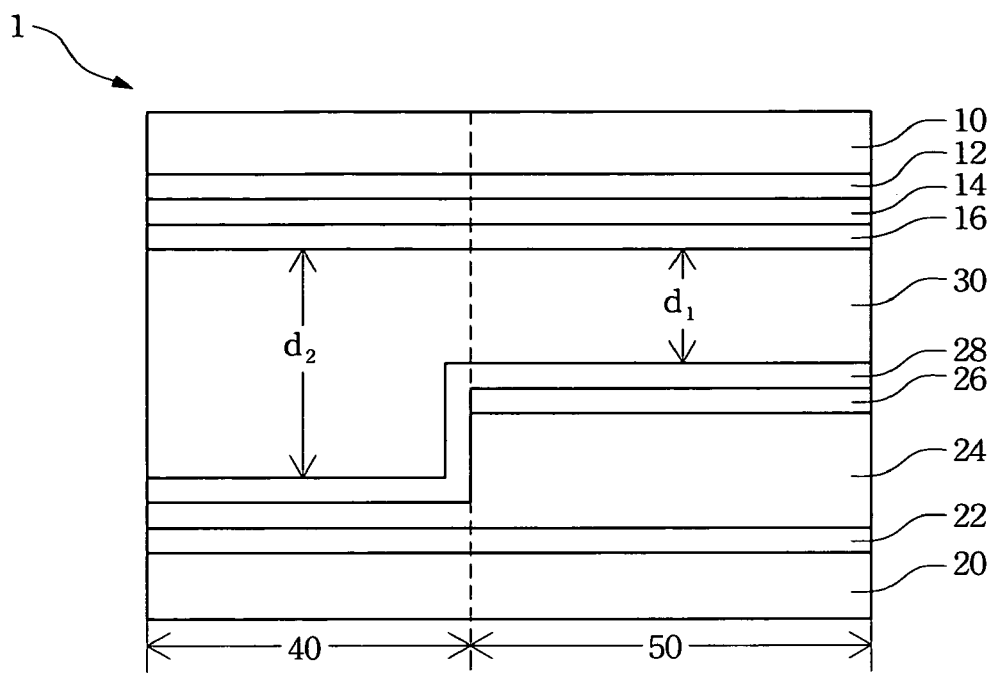
FIG. 1 is a schematic cross-sectional view of the conventional LCD display unit with the dual cell gap design.
Figure 2:
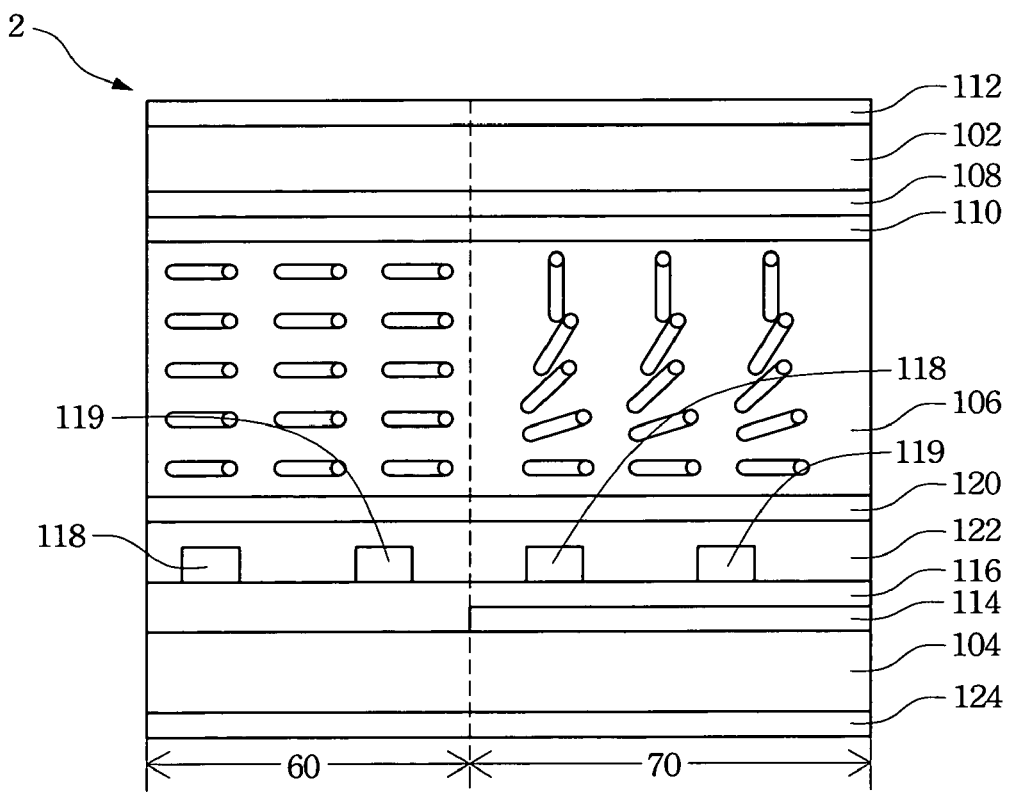
FIG. 2 is a schematic cross-sectional view of the disclosed transflective LCD panel.

With reference to FIG. 2, a transflective display panel 2 has a transmissive region 60 and a reflective region 70. The transflective display panel 2 further contains a pair of parallel upper substrate 102 and lower substrate 104, and a liquid crystal layer 106 filled in the gap between the upper substrate 102 and the lower substrate 104. The inner surface of the upper substrate 102, i.e., the one facing the liquid crystal layer 106, is coated with a color filter 108 and a first alignment film 110. The color filter 108 includes an array of red, blue, and green color films and a black matrix film. The outer surface of the upper substrate 102 is coated with a first polarization film 112. The upper substrate 102 and the lower substrate 104 are transparent substrates, such as glass substrates. A phase delay film (not shown) can be included between the upper substrate 102 and the first polarization film 112 to produce a 90-degree or π/2 phase difference.

The inner surface of the lower substrate 104, i.e., the one facing the liquid crystal layer 106, is coated with a reflective layer 114, an insulating layer 116 to cover the reflective layer 114 and the lower substrate 104 in the reflective region 70. Positive driving electrodes 118 and negative driving electrodes 119 are disposed chiastically on the insulating layer 116, forming an electric field parallel to the lower substrate 104. A second alignment film 120 covers the positive driving electrodes 118 and the negative driving electrodes 119. An insulating layer 122 may be selectively inserted between the second alignment film 120 and the positive and negative driving electrodes 118. A second polarization film 124 is further provided under the lower substrate 104. The reflective layer 114 can be a reflective electrode. A phase delay film (not shown) can be inserted between the lower substrate 104 and the second polarization film 124 to let the backlit incident beam to have a 90-degreee or π/2 phase difference. The insulating layers 116 and 122 can be single-layered or multiple-layered. Their material can be silicon nitride, silicon oxide, silicon oxide nitride, or their combinations.

The alignment configuration of the second alignment film 120 can use the photo-alignment, rubbing, ion-beam, tilt evaporation techniques or some other feasible method. The second alignment film 120 is processed by single-axis parallel orientation to achieve horizontal alignment of the liquid crystal molecules. The characters of the liquid crystal molecules (e.g., dielectric anisotropy, TN type, or STN type) are not restricted. The second alignment film 120 with appropriate alignment can be used to control the liquid crystal molecules to align at a particular angle on the inner side of the lower substrate 104.

The first alignment film 110 on the inner side of the upper substrate 102 uses a UV curable polymer. Using the photo-alignment technique, the first alignment film 110 in the reflective region 70 achieves vertical alignment or large-angle alignment, e.g., 84°, and the first alignment film 110 in the transmissive region 60 achieves horizontal alignment. Hybrid alignment is formed between the first alignment film 110 and the second alignment film 120 in the reflective region 70, whereas homogeneous alignment is formed between the first alignment film 110 and the second alignment film 120 in the transmissive region 60.

The transflective display panel 2 uses the single liquid crystal cell design, presenting a sandwich structure. The liquid crystal layer 106 is sandwiched between the upper substrate 102 and the lower substrate 104. The manufacturing method of the transflective display panel 2 is to form on the lower substrate 104 a reflective electrode 114, an insulating passivation layer 116, a positive driving electrode 118 and a negative driving electrode 119, followed by coating an alignment film. Afterwards, the system is disposed in an oven to bake for tens of minutes in order to cure the alignment film on the surface of the lower substrate 104. After it is taken out, a second alignment layer 120 is formed by single-axis parallel orientation using the photo-alignment, rubbing, or ion-beam technique, achieving horizontal alignment for the liquid crystal molecules in the liquid crystal layer 106. The upper substrate 102 is obtained by forming a color filter layer 108, followed by coating an alignment film. It is then disposed in the oven to bake for tens of minutes. The alignment film uses a UV curable polymer. Afterwards, the photo-alignment technique is employed to form different alignments on the alignment film, thus obtaining the first alignment film 110. The formation of the alignment film is to form a UV curable polymer layer on the upper substrate 102. A photo resist layer is used to block the UV curable polymer layer in the transmissive region. A UV beam hits the UV curable polymer layer in the reflective region to obtain the first alignment film 110.

The first alignment film 110 has vertical alignment or large-angle alignment, e.g., 84° in the reflective region 70 and horizontal alignment in the transmissive region 60. Hybrid alignment is formed between the first alignment film 110 and the second alignment film 120 in the reflective region 70, and homogeneous alignment is formed in the transmissive region 60.

After processing the surfaces of the upper substrate 102 and the lower substrate 104, the adhesive process is done by applying UV glue along the edges of the upper substrate 102 and the lower substrate 104 and then sticking them together by radiating a UV beam. This completes the step of forming a single liquid crystal cell. Afterwards, liquid crystals (such as linear liquid crystals) are filled in the single liquid crystal cell. The reflective region 70 and the transmissive region 60 are thus formed. Of course, the invention can also adopt the One Drop Fill (ODF) method. After filling the liquid crystals, the upper substrate 102 and the lower substrate 10 are attached together.

The invention uses the horizontally chiastic structure of the positive driving electrodes 118 and the negative driving electrodes 119. When an electric field is imposed in the transflective display panel 2, the liquid crystals in the reflective region 70 performs an IPS rotation and becomes bright. If no electric field is imposed, the liquid crystals in the reflective region 70 have hybrid alignment and the reflective region 70 becomes dark. On the other hand, the transmissive region 60 has homogeneous alignment when no voltage is imposed and thus becomes dark. Once a voltage is imposed, the liquid crystal molecules in the transmissive region 60 rotate and become bright.

The disclosed LCD panel uses the IPS technique to control the liquid crystal molecules. The single liquid crystal cell is used in the structure to avoid troubles in the manufacturing process. Most important of all, by controlling the combination of two alignment films between the transmissive region and the reflective region, the liquid crystal molecules in the two regions form different pretilt angles. Therefore, the transmittance vs. voltage curve of the transmissive region and the reflectance vs. voltage curve of the reflective region roughly coincide.

In accordance with the above preferred embodiment of the invention, the LCD panel formed using the disclosed manufacturing method utilizes the IPS technique to obtain a wide solid angle without employing any additional technique. The single cell gap design is used to avoid complexity in the dual cell gap design. A single control circuit controls the transmissive region and the reflective region. This avoids the complexity and difficulty in the array and driving method. Since the complexities in the manufacturing process and the control circuit design are both reduced, the production cost can be greatly lowered.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A liquid crystal display (LCD) panel with a single cell gap design having a transmissive region and a reflective region, the LCD panel comprising:
   an upper substrate;
   a lower substrate arranged in parallel with the upper substrate;
   a first insulating layer covering the lower substrate;
   a reflective layer disposed between the first insulating layer and the lower substrate in the reflective region;
   a second insulating layer covering the first insulating layer;
   a plurality of positive driving electrodes and a plurality of negative driving electrodes wrapped in the second insulating layer and arranged alternately and levelly in the second insulating layer in both the transmissive region and the reflective region;
   a first alignment film formed on a surface of the upper substrate between the upper and lower substrates, having a horizontal alignment in the transmissive region and a vertical alignment in the reflective region, respectively;

a coplanar second alignment film covering the second insulating layer, and only with a horizontal alignment in both the transmissive region and the reflective region; and a liquid crystal layer having liquid crystal molecules, and interposed between the first alignment film and the second alignment film.

2. The LCD panel of claim 1, further comprising a polarization film disposed on outer surfaces of the upper and lower substrates, respectively.

3. The LCD panel of claim 1, wherein the first alignment film and the second alignment film in the transmissive region have a homogeneous alignment.

4. The LCD panel of claim 1, wherein the first alignment film and the second alignment film in the reflective region have a hybrid alignment.

5. The LCD panel of claim 1, wherein the first alignment film is substantially made of a UV curable polymer.

6. The LCD panel of claim 1, wherein the reflective layer comprises a reflective electrode.

7. The LCD panel of claim 1, wherein the positive driving electrodes and the negative driving electrodes are controlled by a single control circuit to control the liquid crystal molecules in both the transmissive and reflective regions.

8. The LCD panel of claim 1, wherein an electric field that is parallel to the lower substrate is imposed by the positive and negative electrodes, liquid crystal molecules of the liquid crystal layer perform In-Plan Switching (IPS) rotations in both the transmissive region and the reflective region.

* * * * *